US009866643B2

(12) United States Patent
Douglas et al.

(10) Patent No.: US 9,866,643 B2
(45) Date of Patent: Jan. 9, 2018

(54) SYSTEMS AND METHODS FOR PROVIDING LOCATION SERVICES

(71) Applicant: CAPITAL ONE SERVICES, LLC, McLean, VA (US)

(72) Inventors: Lawrence Douglas, McLean, VA (US); Thomas Christopher Clarke, Apex, NC (US); Deborah Nally, Williamsburg, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/274,158

(22) Filed: Sep. 23, 2016

(65) Prior Publication Data
US 2017/0093991 A1 Mar. 30, 2017

Related U.S. Application Data

(60) Provisional application No. 62/232,347, filed on Sep. 24, 2015.

(51) Int. Cl.
H04L 29/08 (2006.01)
H04W 4/02 (2009.01)
H04W 60/00 (2009.01)

(52) U.S. Cl.
CPC ............ H04L 67/18 (2013.01); H04L 67/141 (2013.01); H04W 4/021 (2013.01); H04W 60/00 (2013.01)

(58) Field of Classification Search
CPC .............................. H04L 67/18; H04L 67/141
See application file for complete search history.

(56) References Cited

U.S. PATENT DOCUMENTS

2004/0090931 A1* 5/2004 Proctor, Jr. ........... H04W 48/06 370/328
2004/0203883 A1 10/2004 Jollis
(Continued)

OTHER PUBLICATIONS

International Search Report of PCT/US16/53405, mailed from the International Searching Authority dated Dec. 15, 2016.

Primary Examiner — Christopher M Brandt
(74) Attorney, Agent, or Firm — Finnegan, Henderson, Farabow, Garrett & Dunner, LLP

(57) ABSTRACT

Methods and systems are disclosed for providing location services. Consistent with disclosed embodiments, disclosed systems and methods may include a beacon registering device for providing location services. The beacon registering device may include a non-transitory memory storing instructions. The beacon registering device may also include one or more processors that execute the stored instructions to perform operations comprising: receiving beacon information, the beacon information comprising connection information for a first beacon; updating at least one beacon entry stored in a database based on the received beacon information, the beacon entry including a beacon location, beacon connection information, and beacon metadata; receiving a beacon request from a user device, the beacon request indicating a user location; selecting beacons based on the beacon entry and the beacon request, the selected beacons including at least the first beacon; providing selected beacon information to the user device for registering the first beacon with the user device, the selected beacon information including the connection information for the first beacon.

19 Claims, 11 Drawing Sheets

(56) References Cited

U.S. PATENT DOCUMENTS

2014/0237076 A1* 8/2014 Goldman ............ G06F 17/3087
                                                  709/217
2015/0005011 A1* 1/2015 Nehrenz ................ H04W 4/02
                                                  455/456.3

* cited by examiner

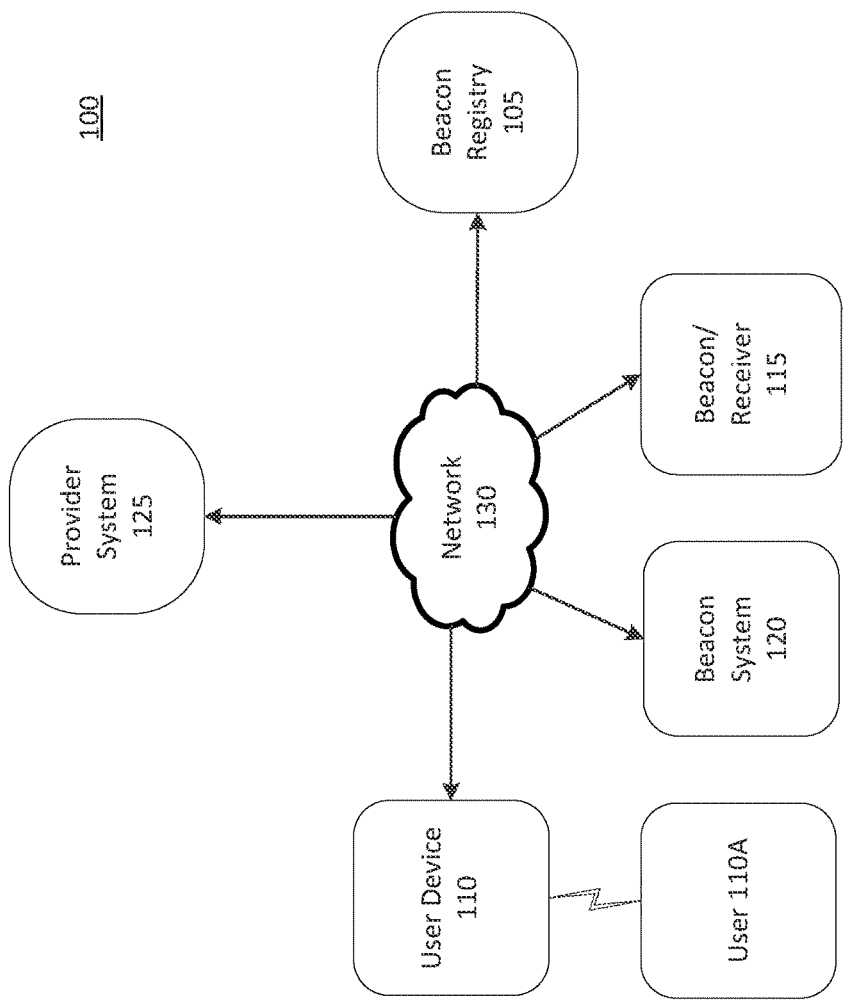

Provider Information Request 380

Fig. 3G

Provider Trigger Request 390

| Provider Trigger Criteria 391 | Trigger Action 393 |

Fig. 3H

SYSTEMS AND METHODS FOR PROVIDING LOCATION SERVICES

RELATED APPLICATIONS

This application claims priority from U.S. Provisional Patent Application No. 62/232,347, filed on Sep. 24, 2015, the entire disclosure of which is incorporated by reference in the present application.

TECHNICAL FIELD

The disclosed embodiments generally relate to systems for providing location services using wireless tag or beacon information associated with multiple providers. More specifically, the disclosed embodiments relate to a beacon registry for wireless tags or beacons that expose an open application programming interface.

BACKGROUND

Providers, such as wireless network service providers or facilities, e.g. office buildings, museums, retail stores, or factories, may provide location services that use, for example, beacons and/or receivers to identify the location of users. But the current fragmented nature of location service provided by different providers hinders the complete realization of these devices' potential. While individual providers or facilities may provide beacons and/or receivers to identify the location of users, the sharing of this information is limited to the network of the provider or facility. In a single navigation, travel, or browsing experience, a user may travel through multiple networks provided or operated by different providers or facilities (e.g., by walking). This fragmentation prevents other providers or facilities from providing targeted information based on the user's current location. These deficiencies also prevent users from receiving location-specific information based on their movement and/or actions over the networks of multiple providers or facilities.

Further, because providers or facilities offering location services are limited to the geographic extent of their network, they receive only fragmentary information about previous user locations. For example, existing systems may not be able to monitor whether a user has previously been in one facility or in another facility. Existing systems may also fail to merge data from surrounding merchants, so the location of a user with respect to surrounding merchants may be undefined. Consequently, surrounding merchants cannot offer directions to their stores or other facilities.

The smaller size and individualized nature of these fragmentary systems also weights against efforts to combine such systems with other data sources regarding customer or visitor behavior. Furthermore, development of tools for exploiting this location information may be hindered by the inconvenient need to use multiple applications specific to individual providers or facilities.

A need therefore exists for methods and systems configured to provide users and individual providers access to location information from multiple different providers. This location information should be provided in some instances through an open API accessible to users, providers, facilities, and others. The API should typically also combine multiple sources of information to provide a more comprehensive picture of users' interests and behavior and be implemented using an application suitable for use with a mobile device.

SUMMARY

The disclosed embodiments may enable collection, storage, and use of location information arising from multiple sources. Managers of beacons and receivers may provide location information to an open API. Users may access this open API to request connection information for nearby beacons. This may enable users currently in a location managed by one network provider to receive location-based services from other network providers that lack beacons or registers in that location. Network providers may benefit from a more complete record of the location history of users, and the pairing of location data with more comprehensive data describing interests and behavior of users. Users may benefit from increased competition, as network providers exploit the additional location information to provide targeted offers, directions, service information, and product information to users.

The disclosed embodiments may include a beacon registering device for providing location services. The beacon registering device may include non-transitory memory storing instructions. The beacon registering device may also include one or more processors that execute the stored instructions to perform operations comprising: receiving beacon information, the beacon information comprising connection information for a first beacon; updating at least one beacon entry stored in a database based on the received beacon information, the beacon entry including a beacon location, beacon connection information, and beacon metadata; receiving a beacon request from a user device, the beacon request indicating a user location; selecting beacons based on the beacon entry and the beacon request, the selected beacons including at least the first beacon; providing selected beacon information to the user device for registering the first beacon with the user device, the selected beacon information including the connection information for the first beacon.

The disclosed embodiments may also include a computer-implemented method for providing location services. The method may include receiving beacon information, the beacon information comprising connection information for a first beacon. The method may also include updating at least one beacon entry stored in a database based on the received beacon information, the beacon entry including a beacon location, beacon connection information, and beacon metadata. The method may also include receiving a beacon request from a user device, the beacon request indicating a user location. The method may also include selecting beacons based on the beacon entry and the beacon request, the selected beacons including at least the first beacon. The method may further include providing selected beacon information to the user device for registering the first beacon with the user device, the selected beacon information including the connection information for the first beacon.

The disclosed embodiments may further include a user device for providing location services. The user device may include non-transitory memory storing instructions. The user device may also include a display. The user device may further include one or more processors that execute the stored instructions to perform operations comprising: intermittently determining a user location and providing the user location to a beacon register in a beacon request; receiving beacon information from the beacon register, the beacon information including connection information for beacons selected by the beacon register; registering the selected beacons using the connection information; receiving an indication from a registered selected beacon; and displaying, on the display, location services information based on the received indication.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings are not necessarily to scale or exhaustive. Instead, emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings:

FIG. 1 depicts an exemplary system for providing location services.

FIGS. 3C-3H depict exemplary messages for providing location services.

DETAILED DESCRIPTION

Figure 2B:
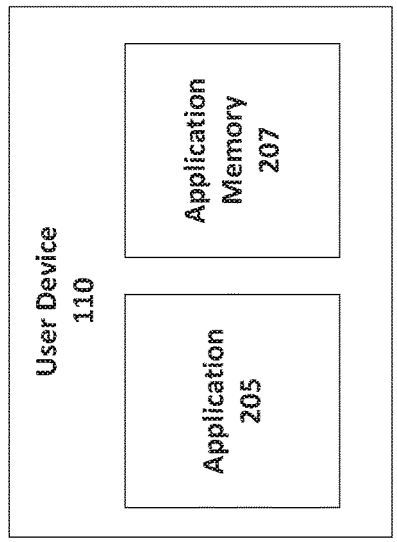
FIGS. 2A-2C depict exemplary components of a system for providing location services.

Reference will now be made in detail to the disclosed embodiments, examples of which are illustrated in the accompanying drawings. Wherever convenient, the same reference numbers will be used throughout the drawings to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus the materials, methods, and examples are illustrative only and are not intended to be necessarily limiting.

FIG. 1 depicts an exemplary system for providing location services, consistent with disclosed embodiments. As described in more detail below, the location services are performed based on location information of a user provided by multiple providers (e.g., network providers) and/or facilities having network coverage. For example, such providers or facilities may comprise wireless network service providers, stadiums, office buildings, hospitals, retail locations, museums, subway station, etc. The providers or facilities may operate beacons and/or receivers. The providers or facilities may also provide other types of network services, such as Wi-Fi coverage. In the following description, the "network providers" and "facilities" may be referred to as "providers" collectively, where it is applicable. Beacon registry 105 may be configured to provide beacon information, consistent with disclosed embodiments. In some embodiments, beacon registry 105 may be configured to enable user devices to receive location signals. For example, beacon registry 105 may be configured to provide connection information for beacons, consistent with disclosed embodiments. The beacons may be selected from a database of beacons maintained by beacon registry 105. As described below with respect to FIGS. 2A and 3A, beacon registry 105 may be configured to maintain the database according to submissions received from one or more of provider systems, beacon systems, beacons and receivers, and user devices.

In some embodiments, the user device may be configured to notify beacon system 120 of the presence and location of user 110a. The envisioned systems and methods then enable applications to gather data across multiple beacons/receivers managed by multiple distinct beacon systems, locations, and providers. This data may be used to identify the location of the user indoors, where GPS location may not be available, identify the manager of surrounding beacons/receivers (e.g., a network provider associated with beacon system 120), identify specific providers, identify others users that are or were near the beacon, manage a user location history to better determine the interests and behavior of users, and provide directions to users. In some embodiments, use of beacon registry 105 by one or more of users (e.g., user 110a) and provider systems (e.g., provider system 125) may require payment of a fee. The fee may be paid to the owners of the beacons/receivers, and to the owners of other contributed data sources, such as transaction information.

Beacon registry 105 may be configured to receive beacon information, consistent with disclosed embodiments. Beacon information may be received from one or more of a beacon system, such as beacon system 120, and a beacon or receiver, such as beacon/receiver 115. Beacon registry 105 may be configured to receive beacon requests. Beacon requests may be received from a user device, such as user device 110. Beacon registry 105 may be configured to receive user messages. User messages may be received from a user device, such as user device 110. Beacon registry 105 may be configured to receive provider information requests. Provider information requests may be received from a provider system, such as provider system 125. Beacon registry 105 may be configured to select information about beacons based on requests. Beacon registry 105 may be configured to provide the selected beacon information. For example, the selected beacon information may be provided to a user device, such as user device 110. The content of the messages provided and received by beacon registry 105 is described in detail with regards to FIGS. 3C-3H.

Beacon registry 105 may comprise one or more computing systems configured to execute software instructions stored on one or more memory devices to perform one or more operations consistent with the disclosed embodiments. For example, beacon registry 105 may include one or more memory device(s) storing data and software instructions and one or more processor(s) configured to use the data and execute the software instructions to perform server-based functions and operations known to those skilled in the art. Beacon registry 105 may include one or more computers, workstations, servers, or networked collections of servers, consistent with disclosed embodiments. Beacon registry 105 may be standalone, or it may be part of a subsystem, which may be part of a larger system. For example, beacon registry 105 may comprise a component of an overall provider system. As a non-limiting example, beacon registry 105 may comprise a component of a provider system associated with a financial services provider.

Beacon system 120 may be configured to implement a web service or a file system service. As an additional example, the web service may be implemented with one or more widely used web-service protocols, such as JavaScript Object Notation Web-Service Protocol (JSON-WSP) and Simple Object Access Protocol-Web Services Description Language (SOAP-WSDL). In various aspects, the web service may be implemented according to a representational state transfer (REST) web service architecture. One of skill in the art would recognize that numerous other web services and file system services may be used, and that this description is not intended to be limiting. In some aspects, beacon system 120 may be configured to expose an application programming interface. Beacon system 120 may be configured to provide and receive information from other components of location system 100 through the application programming interface.

User device 110 may be configured to interact with components of location system 100 to receive location services, consistent with disclosed embodiments. In some embodiments, user device 110 may be configured to provide a beacon request to beacon registry 105. In some aspects, user device 110 may be configured to receive information about selected beacons from beacon registry 105. User device 110 may be configured to use the selected beacon information in processing signals from beacons or receivers. In certain aspects, user device 110 may be configured to provide user messages to one or more of beacon registry 105 and a second user device (not shown). The second user device may be configured to process signals from beacons or receivers based on the user messages. In various aspects, user device 110 may be configured to receive signals from beacon/receiver 115. In some aspects, in response to the received signals, user device 110 may be configured to communicate with one or more of the beacon registry 105, beacon/receiver 115, beacon system 120, and provider system 125.

User device 110 may include, as a non-limiting example, a consumer electronics device such as a smartphone, tablet, netbook, electronic reader, wearable display (e.g., electronic glasses), smart watch, personal digital assistant, personal computer, laptop computer, tracking device (e.g., Bluetooth tag), and/or other types of electronics or communication devices. A non-limiting example of such a computing device is provided below in FIG. 8. In some embodiments, user device 110 may be configured to support Bluetooth low energy device profiles. For example, user device may be configured to act according to one or more of a broadcaster, observer, peripheral, or central profile in a Bluetooth connection.

User 110a may operate user device 110 or direct operation of user device 110, consistent with disclosed embodiments. User 110a may operate user device 110 to communicate with one or more components of location system 100, consistent with disclosed embodiments. In some embodiments, user 110a may interact with user device 110 while navigating an environment, such as a retail environment (e.g., a store or a mall), a public building (e.g., a museum, hospital, school, or governmental building), or a worksite (e.g., a factory or corporate office). User 110a may operate user device 110 to receive location services information.

In some embodiments, one or more components of location system 100 may be configured to associate user information with user 110a. The one or more components may be configured to associate user information with user device 110. As a non-limiting example, the associated user information may comprise account information (e.g., financial services account information), demographic information, user preferences, and social networking activity. As described in greater detail below, the operations of location system 100 may depend on the user information associated with user device 110.

Beacons/Receivers 115 may be configured to interact with one or more components of location system 100. In some embodiments, beacons/receivers 115 may be configured to interact with user device 110. For example, beacons/receivers 115 may be configured to detect the presence of and/or communicate with a proximate user device (e.g., user device 110). In some aspects, beacons/receivers 115 may comprise one or more beacons, such as Bluetooth low energy beacons, radio frequency identification (RFID) tags, wireless transmitters and/or any other type of transmitter configured to provide a location signal for detection by user device 110. In various aspects, beacons/receivers 115 may comprise one or more receivers, such as Bluetooth low energy devices, radio frequency identification (RFID) receivers, wireless receivers and/or any other type of receiver configured to receive a location signal provided by user device 110. In some embodiments, beacons/receivers 115 may be configured to support Bluetooth low energy device profiles. For example, beacons/receivers 115 may be configured to act according to one or more of a broadcaster, observer, peripheral, or central profile in a Bluetooth connection. Location system 100 may be configured based on the assumption that the location of user device 110 indicates the location of user 110a. In some exemplary embodiments, beacons/receivers 115 may include one or more processor(s) configured to access data and/or execute software instructions stored in memory to perform one or more processes consistent with the disclosed embodiments. In some exemplary embodiments, beacons/receivers 115 may be located entirely or partially within an environment managed by beacon system 120.

In some embodiments, a sensor identifier may be associated with each of beacons/receivers 115. In certain aspects, these sensor identifiers may comprise numeric or alphanumeric strings. Components of location system 100 may be configured to use sensor identifiers to locate user device 110. In some exemplary embodiments, a sensor identifier may be a Bluetooth identifier corresponding to one of beacons/receivers 115. In other exemplary embodiments, sensor identifier may include a Bluetooth profile associated with beacons/receivers 115. In yet other exemplary embodiments, one or more sensor identifiers may include a coordinate position of one or more of beacons/receivers 115. In some aspects, this coordinate position may be relative to an origin disposed within an environment associated with beacon system 120. For example, the origin may correspond to a service location within the environment, such as a point of service; an access point of the environment; or a subdivision of the environment, such as a department of a store, a unit of a hospital, or a manufacturing or loading bay of a worksite, such as a factory or warehouse.

Beacon System 120 may be configured to complement or supplement beacons/receivers 115, consistent with disclosed embodiments. In some embodiments, beacon system 120 may be configured to communicate with one or more of beacons/receivers 115. For example, beacon system 120 may configure beacons/receivers 115 for use in location system 100. As an additional example, beacon system 120 may be configured to receive information from one or more of beacons/receivers 115. In some aspects, this received information may have originally been provided by user device 110. In certain embodiments, beacon system 120 may be configured to communicate with user device 110. For example, beacon system 120 may be configured to receive information from user device 110. In some aspects, the received information may have been provided by the one or more of beacons/receivers 115. Beacon system 120 may be configured to provide location services information based on the received information.

Beacon system 120 may comprise one or more computing systems configured to execute software instructions stored on one or more memory devices to perform one or more operations consistent with the disclosed embodiments. For example, beacon system 120 may include one or more memory device(s) storing data and software instructions and one or more processor(s) configured to use the data and execute the software instructions to perform server-based functions and operations known to those skilled in the art. Beacon system 120 may include one or more computers, workstations, servers, or networked collections of servers, consistent with disclosed embodiments. Beacon system 120 may be standalone, or it may be part of a subsystem, which may be part of a larger system. For example, beacon system 120 may comprise a component of an overall provider system. In certain aspects, beacon system 120 and beacons/receivers 115 may be provided by a common entity. As a non-limiting example, a retailer may place beacons/receivers 115 in a retail environment. The retailer may implement a provider system comprising beacon system 120. Beacon system 120 may be configured to provide location services functionality for user devices (e.g., user device 110) interacting with beacons and receivers (e.g., beacon/receiver 115).

Beacon system 120 may be configured to implement a web service or a file system service. As an additional example, the web service may be implemented by one or more of JSON-WSP and SOAP-WSDL. In various aspects, the web service may be implemented according to a representational state transfer (REST) web service architecture. One of skill in the art would recognize that numerous other web services and file system services may be used, and that this description is not intended to be limiting. In some aspects, beacon system 120 may be configured to expose an application programming interface. Beacon system 120 may be configured to provide and receive information from other components of location system 100 through the application programming interface.

Provider system 125 may be configured to use location system 100 to manage interactions with user device 110. In some embodiments, provider system 125 may be configured request user information from beacon registry 105. As described in greater detail below, such user information may concern individual users of location system 100 or users of location system 100 considered in the aggregate. In certain embodiments, provider system 125 may be configured to provide provider trigger requests to beacon registry 105. As described in greater detail below, such provider trigger requests may be specific to individual users or may concern categories of users of location system 100.

Provider system 125 may use location system 100 to provide context-sensitive information to user device 110, consistent with disclosed embodiments. As a non-limiting example, a retailer may place beacons/receivers 115 in a retail environment. The placement of these beacons may correspond to certain goods and services. For example, the beacons may be placed near certain goods, like clothes, or in locations indicative of certain services, like restaurants, movie theaters, or amusement parks. A provider, e.g., a merchant, associated with provider system 125 may provide competitive or related goods and services. As non-limiting examples, the retailer and the merchant may sell competing brands of clothing, or the retailer may sell fatty food and the merchant may sell dieting products. The merchant may use the information about the whereabouts of user 110a to inform offers provided to user 110a. For example, provider system 125 may be configured to provide offers indicating discounts, special promotions, or directions to locations where the merchant provides the goods and services.

Provider system 125 may comprise one or more computing systems configured to execute software instructions stored on one or more memory devices to perform one or more operations consistent with the disclosed embodiments. For example, provider system 125 may include one or more memory device(s) storing data and software instructions and one or more processor(s) configured to use the data and execute the software instructions to perform server-based functions and operations known to those skilled in the art. Provider system 125 may include one or more computers, workstations, servers, or networked collections of servers, consistent with disclosed embodiments. Provider system 125 may be standalone, or it may be part of a subsystem, which may be part of a larger system. For example, provider system 125 may comprise a component of an overall merchant system. In certain aspects, provider system 125 may be provided by an entity distinct from one or more of beacon system 120, beacon registry 105, and beacon/receiver 115.

Provider system 125 may be configured to implement a web service or a file system service. As an additional example, the web service may be implemented one or more of JSON-WSP and SOAP-WSDL. In various aspects, the web service may be implemented according to a representational state transfer (REST) web service architecture. One of skill in the art would recognize that numerous other web services and file system services may be used, and that this description is not intended to be limiting. In certain aspects, provider system 125 may be configured to provide and receive information from other components of location system 100 using the web service.

Network 130 may enable the components of location system 100 to communicate, consistent with disclosed embodiments. Network 130 may include one or more wired and/or wireless networks. For example, network 130 may include a cellular network, a public land mobile network, a local area network, a wide area network, a metropolitan area network, a fixed telephone network, an intranet, the Internet, a fiber optic-based network, a Bluetooth network, a radio network, a near-field network, or any other type of electronics communications network known to one of skill in the art. Components of location system 100 may be configured to communicate using network 130.

Figure 2A:
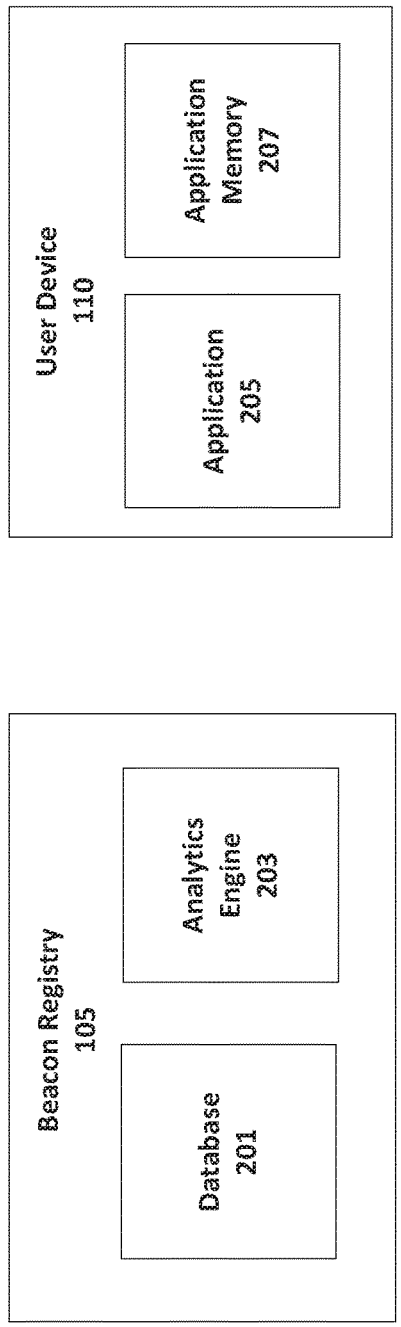
Figure 2C:
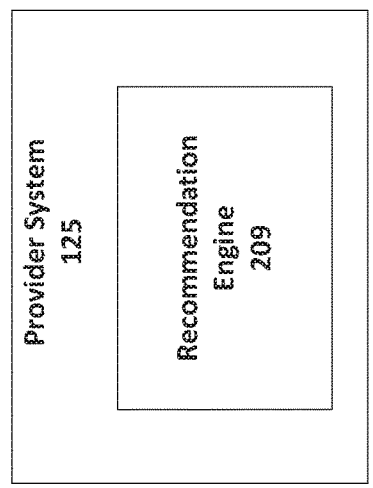

FIGS. 2A-2C depict exemplary components of a system for providing location services, consistent with disclosed embodiments. In some aspects, as shown in FIG. 2A, beacon registry 105 may comprise database 201 and analytics engine 203. Beacon registry 105 may be configured to store information received from components of location system 100 in database 201. In some embodiments, database 201 may be implemented as a hierarchical database, relational database, object-oriented database, document-oriented database, graph-oriented database, key-value database, or any combination thereof. In some aspects, database 201 may be distributed across one or more devices. One of skill in the art would recognize many suitable implementations of database 201, and the envisioned embodiments are not intended to be limited to a particular implementation.

Beacon registry 105 may be configured to use analytics engine 203 to process data stored in database 201, consistent with disclosed embodiments. In some aspects, analytics engine 203 may be configured to generate responses to queries received by beacon registry 105 from components of location system 100. For example, analytics engine 203 may be configured to generate user information for provision to one or more of provider system 125 and beacon system 120. In certain aspects, analytics engine 203 may be configured to generate recommendations for provision to user device 110. As a non-limiting example, analytics engine 203 may comprise one or more programs interacting with a statistical package, such as SAS Enterprise Miner™, Statistica, SPSS®, Revolution R Enterprise, or similar enterprise statistical software. One of skill in the art would recognize many suitable implementations of analytics engine 203, and the envisioned embodiments are not intended to be limited to a particular implementation.

In some embodiments, as shown in FIG. 2B, user device 110 may comprise application 205 and application memory 207. In certain aspects, user device 110 may be configured to execute application 205 as a process on user device 110. As described in greater detail below, application 205 may be configured to provide a user interface for interacting with components of location system 100. For example, application 205 may be configured to cause user device 110 to contact other components of location system 100, such as beacon registry 105, beacon/receiver 115, beacon system 120, or provider system 125. For example, user device 110 may be configured by the location application to provide beacon requests to beacon registry 105. As an additional example, user device 110 may be configured by the location application to provide user messages to one or more components of location system 100. User device 110 may be configured by the location application to receive location service information. Location service information may include directions to a particular location, such as a particular store, clinic, facility, parking spot, or point of interest.

Application memory 207 may comprise a memory on user device 110 configured to store information relating to location system 100. For example, as describe below, application memory 207 may be configured to store information regarding user 110a. In some aspects, application 205 may be configured to store, retrieve, modify, and delete information in application memory 207. Application memory 207 may be implemented using one or more of non-transitory solid state memory, hard disk memory, memory registers, cache, or other memory resources of user device 110.

In some aspects, as shown in FIG. 2C, provider system 125 may comprise recommendation engine 209. In some aspects, recommendation engine 209 may be configured to generate offers based on information received by provider system 125 from components of location system 100. For example, recommendation engine 209 may be configured to generate recommended offers for user device 110 based on user information possessed by provider system 125, and/or received from one or more of user device 110 and beacon registry 105. As a non-limiting example, recommendation engine 209 may comprise one or more programs interacting with a statistical package, such as SAS Enterprise Miner™, Statistica, SPSS®, Revolution R Enterprise, or similar enterprise statistical software. One of skill in the art would recognize many suitable implementations of recommendation engine 209, and the envisioned embodiments are not intended to be limited to a particular implementation.

Figure 3A:
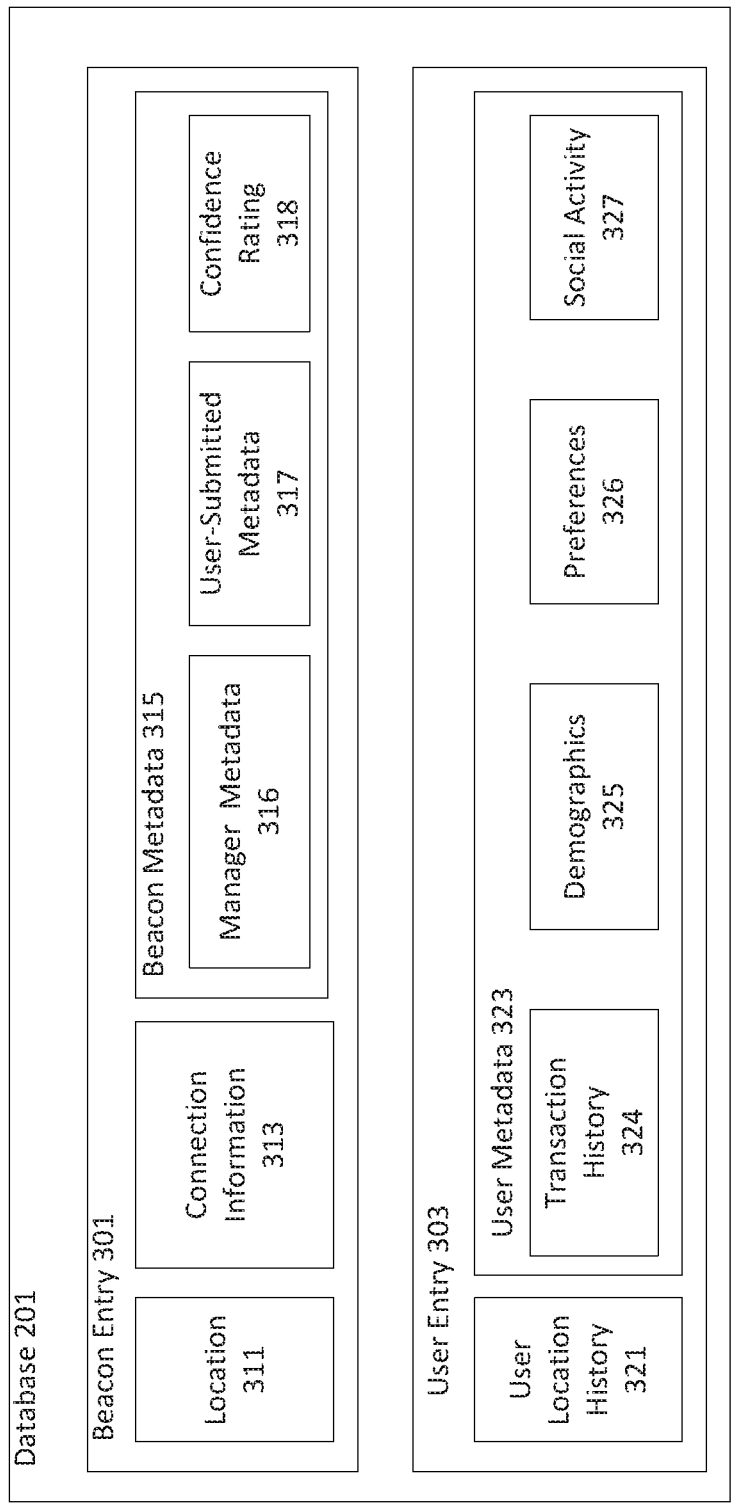
FIGS. 3A and 3B depict exemplary components of a system for providing location services.
Figure 3B:
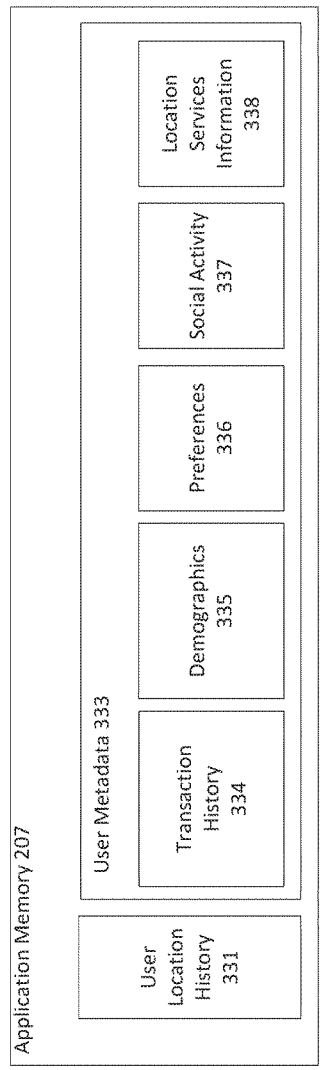

FIGS. 3A and 3B depict exemplary components of a system for providing location services. As shown in FIG. 3A, database 201 may comprise beacon entries, such as beacon entry 301, and user entries, such as user entry 303. Beacon registry 105 may be configured to update one or more of beacon entries and user entries based on information received from other components of location system 100. In certain aspects, beacon registry 105 may be configured to store, retrieve, modify, and/or delete beacon entries and user entries based on received information.

Beacon entries may store data and instructions concerning beacons or receivers, such as beacons/receivers 115. In some embodiments, a beacon entry, such as beacon entry 301, may correspond to one or more beacons and/or receivers. For example, database 201 may be configured with a beacon entry for each beacon or receiver in location system 100. In certain embodiments, database 201 may be configured with a beacon entry for multiple beacons and/or receivers. For example, database 201 may be configured with a beacon entry for beacons and/or receivers of a department, store, beacon system, retailer, and/or geographical area.

Beacon entries, such as beacon entry 301, may comprise one or more of location 311, connection information 313, and beacon metadata 315. In some aspects, location 311 may comprise one or more of data and instructions for determining the physical location of at least one beacon and/or receiver. In certain aspects, location 311 may be defined in absolute terms. For example, location 311 may be defined using a geographic coordinate system, such as latitude and longitude, or Global Positioning System coordinates. In various aspects, location 311 may be defined in relative terms. For example, location 311 may be defined relative to the entrance of a store, hospital, mall, park, highway, or other environment (e.g., 10' north, 5' east of southwest mall entrance). Similarly, location 311 may be defined relative to a cell tower or multiple cell towers (e.g., cell tower triangulation).

Connection information 313 may comprise one or more of data and instructions for managing connections between a user device, such as user device 110, and at least one beacon and/or receiver. Connection information 313 may include security and identity information necessary for the user device 110 to establish a connection with a beacon and/or receiver. For example, connection information 313 may include data or instructions enabling user device 110 to connect to a particular beacon and/or receiver. For example, connection information 313 may include a device identifier, such as a universally unique identifier (UUID) or similar identifier. In some aspects, connection information 313 may comprise data or instructions enabling user device 110 to connect to multiple beacons and/or receivers.

Beacon metadata 315 may comprise data or instructions concerning one or more beacons and/or receivers. This information may be described with regard to origin, consistent with disclosed embodiments. In some embodiments, beacon metadata 315 may comprise manager metadata 316, user-submitted metadata 317, and confidence rating 318.

In some aspects, beacon registry 105 may be configured to update beacon entries with data or instructions regarding at least one beacon provided by the entity managing the at least one beacon, such as manager metadata 316. For example, where a retailer controls one or more of beacon system 120 and beacons/receivers 115, the retailer may provide manager metadata regarding the beacons/receivers 115. As an additional example, manager metadata may be provided by the entity controlling beacon registry 105. Non-limiting examples of manager metadata may include information regarding the location, purpose, surroundings, and functionality of the beacon. Similarly, manager information may include store department, beacon owner (e.g., owner, retail location name), photos of the location and the surrounding area. For example, a retailer may use location system 100 to provide manager metadata indicating that a brand of blue jeans is available near a particular beacon.

In some aspects, beacon registry 105 may be configured to update beacon entries with data or instructions received from users of location system 100, such as user-submitted metadata 317. As a non-limiting example, user-submitted metadata 317 may include a description of a beacon, such as a note, annotation, review, comment, or similar information. For example, beacon registry 105 may be configured to receive user messages from user devices indicating products in the vicinity of one or more of beacons/receivers 115. As a non-limiting example, beacon register 105 may be configured to store a message provided by a user of location system 100, a such as a message indicating the availability of a particular brand of blue jeans near one of beacons/receivers 115, or that a particular vending machine, automatic teller, airline check-in terminal, ticket-providing machine, or similar destination device near one of beacons/receivers 115 was not working.

In some aspects, beacon registry 105 may be configured to update confidence rating 318 of beacon entries based on data or instructions received from users of location system 100. In some embodiments, confidence rating 318 may depend on one or more rankings. In certain aspects, the rankings may indicate the general satisfaction of users with a beacon and/or receiver. For example, users may provide low rankings when the beacon is a "spoof" beacon that attempts to mimic a beacon of a reputable retailer. As an additional example, users may provide low rankings when the goods and/or services associated with the beacon are low-quality or undesirable. Overall confidence ratings may be calculated from individual rankings according to methods known to one of skill in the art.

Beacon registry 105 may be configured to restrict the ability of users to provide rankings, for example, by requiring users to register, create a profile, or otherwise identify themselves. As would be appreciated by one of skill in the art, beacon registry 105 may be configured to enable one or more of the manager of beacon registry 105 and the manager of beacons/receivers 115 and/or beacon system 120 to modify, delete, enable, disable, and/or erase user-submitted metadata 317 and confidence rating 318.

Confidence rating 318 may depend on sources of beacon information, consistent with disclosed embodiments. For example, beacon registry 105 may be configured to assign a lower confidence rating 318 to beacon entries for beacon systems with (i) few beacons registered with beacon registry 105, (ii) beacons registered relatively recently (for example, within the past day, week, or month), or (iii) a beacon system associated with an unknown entity. As an additional example, beacon registry 105 may be configured to assign a higher confidence rating 318 to beacon entries for beacon systems with (i) many beacons registered with beacon registry 105, (ii) beacons registered for relatively long time (for example, greater than a month, six months, or a year), or (iii) a beacon system associated with a known entity (for example, a major retailer or financial institution).

Confidence rating 318 may depend on the freshness of the beacon information, consistent with disclosed embodiments. For example, beacon registry 105 may be configured to assign a lower confidence rating 318 to beacon entries that have not been updated or modified within a certain period of time (for example, entries that have not been modified within the past day, week, or month). As an additional example, beacon registry 105 may be configured to assign a higher confidence rating 318 to beacon entries for beacon systems that have been updated within a certain period of time (for example, entries that have been modified within the past hour, day, week, or month).

Confidence rating 318 may depend on the frequency with which the beacon information is updated, consistent with disclosed embodiments. For example, beacon registry 105 may be configured to assign a lower confidence rating 318 to beacon entries that have not been updated or modified frequently (for example, at least once a month). As an additional example, beacon registry 105 may be configured to assign a higher confidence rating 318 to beacon entries for beacon systems that have been updated or modified frequently (for example, at least once a day or once a month).

User entries may store data and instructions concerning users of location system 100, such as user 110a, consistent with disclosed embodiments. In some embodiment, user entries may correspond to one user. In certain embodiments, user entries may correspond to multiple users. In some aspects, beacon registry 105 may be configured to create user entries based on user indications of a desire to create a user profile. For example, users of location system 100 may interact with beacon registry 105 to create user entries. As a non-limiting example, application 205 may be configured to enable users of location system 100 to manage user entries with beacon registry 105. In certain aspects, beacon registry 105 may be configured to create user entries, such as user entry 303, absent user indications of a desire to create a user profile. For example, beacon registry 105 may be configured to automatically create a user entry (e.g., user entry 303) corresponding to users of location system 100. In certain aspects, user entries may correspond to user devices (e.g., user device 110) rather than users.

User entry 303 may comprise user location history 321, consistent with disclosed embodiments. User location history 321 may comprise data and/or instructions indicating a time history of user locations. In some embodiments, user location history 321 may be updated when user device 110 contacts beacon registry. For example, application 205 may be configured to cause user device 110 to provide its current location upon requesting beacon information from beacon registry 105. In some embodiments, user location history 321 may be updated intermittently. For example, application 205 may be configured to periodically provide the current location of user device 110, when possible. As a non-limiting example, application 205 may be configured to provide the current location of the user device to the beacon registry every hour, while the user device is powered on and connected to network 130. Because the user device may not be consistent powered on and connected to network 130, the current location of user device 110 may consequently be provided intermittently. In some embodiments, application 205 may be configured to provide the current location of the user device to the beacon registry periodically, and upon requesting beacon information from beacon registry 105. Stored locations of user location history 321 may comprise absolute or relative locations, as described above with regards to location 311.

User entry 303 may comprise user metadata 323, consistent with disclosed embodiments. User metadata 323 may comprise data and/or instructions about the user associated with user entry 303 (e.g., user 110a). In some embodiments, user metadata 323 may comprise one or more of transaction history 324, demographics 325, preferences 326, and social activity 327. In some aspects, beacon registry 105 may be configured to obtain user metadata 323 from users (e.g., user 110*a*). In certain aspects, one or more components of user metadata 323 may be obtained from scraping websites; from third party information providers; from account information maintained by an entity associated with beacon registry 105, such as a financial services provider associated with beacon registry 105; or from similar information sources known to one of skill in the art.

Transaction history 324 may comprise a transaction history associated with a user, consistent with disclosed embodiments. In certain aspects, the transaction history may comprise transactions originating in one or more accounts associated with the user. The accounts may be financial services accounts, such as checking, savings, credit card accounts, or similar accounts known to one of skill in the art. In some aspects, the transaction history may comprise transactions of a user terminating in one or more accounts associated with one or more providers, e.g., merchants. For example, transaction history 324 may comprise transactions between a user and a particular merchant. Transaction history 324 may include one or more of transaction dates, amounts, and category codes indicating a type of transferee.

Demographics 325 may comprise demographic information associated with a user, consistent with disclosed embodiments. For example, demographic information may include one or more of age, sex, home address, work address, employment status, household income, or similar demographic information known to one of skill in the art.

Preferences 326 may comprise data or instructions expressing user preferences, consistent with disclosed embodiments. In some aspects, beacon registry 105 may be configured to receive preferences 326 from user device 110. For example, application 205 may be configured to provide indications of user preferences to beacon registry 105 in response to input received through a graphical user interface from user 110*a*. In some embodiments, beacon registry 105 may be configured to provide beacon information to user device 110 according to restrictions expressed in preferences 326. In some aspects, these restrictions may concern location. For example, preferences 326 may bar providing beacon information for beacons in certain locations. These locations may be user-defined. In certain aspects, these restrictions may concern beacon metadata. For example, preferences 326 may bar providing beacon information for beacons with confidence ratings 318 lower than a certain threshold. In certain embodiments, beacon registry 105 may be configured to provide user information to provider systems (e.g., provider system 125) according to restrictions expressed in preferences 326. For example, preferences 326 may generally bar providing user information. As an additional example, preferences 326 may bar providing one or more of transaction history 324, or data derived from transaction history 324, such as summary data; demographics 325; preferences 326; and social activity 327. Preferences 326 may permit providing user information to specified providers.

Social activity 327 may comprise social networking activity tracked by beacon registry 105. For example, social activity 327 may comprise a record of activity using one or more social media applications like Facebook, Twitter, Pinterest, Snapchat, Vine, or similar applications. Beacon registry 105 may be configured to receive the record of activity from user device 110, for example, through application 205, or from third-party information providers.

As shown in FIG. 3B, user device 110 may be configured with application memory 207, as described above with respect to FIG. 2C. In some embodiments, user device 110 may be configured to store in application memory 207 one or more of user location history 331 and user metadata 333. In some embodiments, user device 110 may be configured to store one or more components of user location history 331 and user metadata 333 additionally or alternatively to beacon registry 105 storing corresponding user location history 321 and user metadata 323 in database 201. For example, in some embodiments, user device 110 may store one or more components of user metadata 333 in place of beacon registry 105 storing one or more corresponding components of user metadata 323. For example, user device 110 may be configured to store in application memory 207 one or more of transaction history 334, demographics 335, preferences 336, and social activity 337 in place of beacon registry 105 storing transaction history 324, demographics 325, preferences 326, and social activity 327 on database 201. The composition of user location history 331, transaction history 324, demographics 325, preferences 326, and social activity 327 may resemble the composition of user location history 321, transaction history 324, demographics 325, preferences 326, and social activity 327, respectively, as described above with regards to FIG. 3A.

Location services information 338 may comprise one or more of offers, directions, and product information provided for user 110*a*. Application 205 may be configured to generate at least a portion of location services information 338. For example, application 205 may be configured to download offers and product information. As a non-limiting example, application 205 may be configured to download offers and product information from one or more of provider system 125, beacon system 120, and beacon registry 105. In some embodiments, application 205 may be configured to generate offers and product information from downloaded data and instructions.

FIGS. 3C-3H depict exemplary messages for providing location services, consistent with disclosed embodiments. As would be recognized by one of skill in the art, the envisioned systems and methods are not intended to be limited to the particular messages described. Components of location system 100 may be configured to exchange, without departing from the envisioned embodiments, additional messages, fewer messages, messages combining contents of the disclosed messages, or messages distributing among multiple messages the contents of the disclosed messages.

Figure 3C:
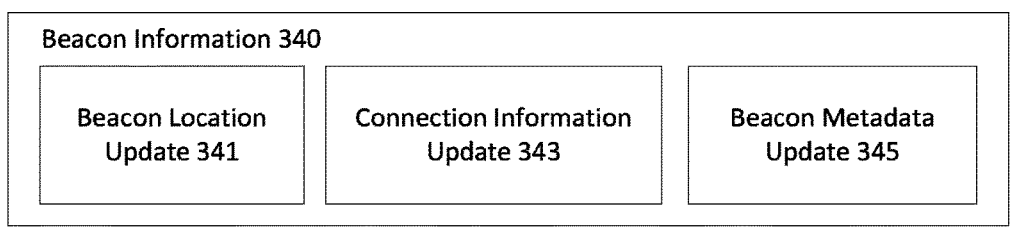

FIG. 3C discloses an exemplary beacon information message 340 consistent with disclosed embodiments. In some embodiments, beacon registry 105 may be configured to receive beacon information message 340. Beacon registry 105 may be configured to receive beacon information message 340 from a beacon system, such as beacon system 120. In certain aspects, beacon system 120 may be configured to provide beacon information message 340 using the web services API exposed by beacon registry 105. Beacon registry 105 may be configured to create, modify, or delete one or more beacon entries (e.g., beacon entry 301) in response to receiving beacon registry 105. Beacon information message 340 may comprise one or more of beacon location update 341, connection information update 343 and beacon metadata update 345, consistent with disclosed embodiments.

As described above with respect to FIG. 3A, beacon location update 341 may comprise data or instructions indicating an absolute or relative location of the one or more beacons and/or receivers associated with the beacon entry. In some aspects, beacon location update 341 may indicate an initial position of at least one beacon. In various aspects, beacon location update 341 may indicate a new position of at least one beacon.

Connection information update 343 may comprise data or instructions enabling a user device to connect to a particular beacon and/or receiver, consistent with disclosed embodiments. For example, connection information update 343 may include a device identifier, such as a UUID or similar identifier. In some aspects, connection information update 343 may comprise data or instructions enabling a user device to connect to multiple beacons and/or receivers. In some aspects, connection information update 343 may include initial connection information for at least one beacon and/or receiver. In various aspects, connection information update 343 may indicate new connection information for at least one beacon and/or receiver.

Beacon metadata update 345 may comprise data or instructions enabling a user device to connect to a particular beacon and/or receiver, consistent with disclosed embodiments. For example, beacon metadata update 345 may include manager metadata, as described with regards to FIG. 3A. In some aspects, beacon metadata update 345 may create manager metadata for the at least one beacon and/or receiver. In various aspects, beacon metadata update 341 may update, supplement, modify, and/or delete existing manager metadata for the at least one beacon and/or receiver.

Figure 3D:
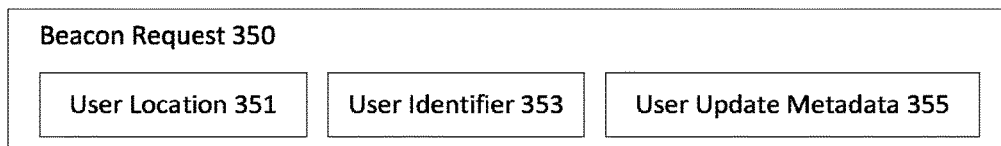

FIG. 3D discloses an exemplary beacon request message 350 consistent with disclosed embodiments. In some embodiments, application 205 may be configured to cause user device 110 to provide a beacon request message 350 to beacon registry 105. In some embodiments, user device 110 may be configured to provide beacon request message 350 using the web services API exposed by beacon registry 105. In some embodiments, beacon request message 350 may comprise one or more of user location 351, user identifier 353, and user update metadata 355.

User location 351 may comprise data or instructions indicating the location of user device 110. As described above with regards to FIG. 3A, the location of user device 110 may comprise an absolute location or a relative location. In some aspects, beacon registry 105 may be configured to update user location history 321 based on the data or instructions comprising user location 351.

User identifier 353 may comprise identifying data or instructions. In some aspects, user identifier 353 may identify user 110a. For example, user identifier 353 may comprise a username and password, International Mobile Subscriber Identity (IMSI), or similar data for identifying user 110a known to one of skill in the art. In certain aspects, user identifier 353 may identify user device 110. For example, user identifier 353 may comprise a Mobile Station International Subscriber Directory Number (MSISND), a media access control address (MAC address), or similar data for identifying user device 110. In some embodiments, beacon registry 105 may be configured to determine user entry 303 based on user identifier 353.

User update metadata 355 may comprise a description of a beacon, such as one or more of a note, annotation, review, comment, or similar information. In some implementations, user update metadata 355 may comprise an identifier of one or more beacon entries in database 201. For example, user update metadata may include a comment that particular merchandise is near a beacon and/or receiver, or that a destination device near a beacon and/or receiver, such as an ATM, ticket dispenser, airline check-in terminal, or similar device, is broken. In some embodiments, beacon registry 105 may be configured to update the user-submitted metadata 317 for a beacon entry (e.g., beacon entry 301) based on user update metadata 355.

Figure 3E:
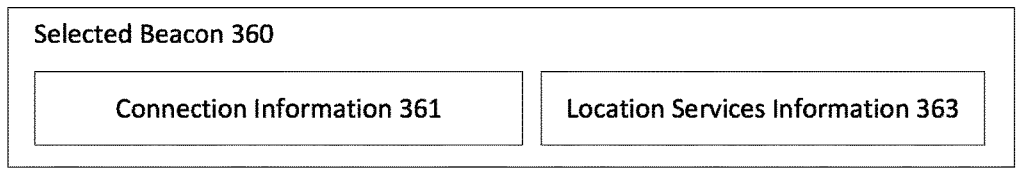

FIG. 3E discloses an exemplary selected beacon message 360 consistent with disclosed embodiments. In some embodiments, beacon registry 105 may be configured to provide one or more selected beacon messages 360 to user device 110. In some aspects, beacon registry 105 may be configured to provide the one or more selected beacon messages 360 to user device 110 in response to receiving a beacon request message 350. In some embodiments, selected beacon message 360 may comprise one or more of connection information 361 and location services information 363.

Connection information 361 may comprise data and instructions enabling user device 110 to connect with one or more selected beacons and/receivers, consistent with disclosed embodiments. For example, connection information 361 may comprise connection information stored in beacon registry 105 for beacons meeting selection criteria. In certain embodiments, beacon registry 105 may be configured to select beacons based on proximity. For example, beacon registry 105 may be configured to select beacons based on the distance between the location of user device 110 and the location of the beacon. Beacon registry 105 may be configured to use user location 351, provided by the beacon request, as the location of user device. Beacon registry 105 may be configured to use location 311 as the location of the at least one beacon and/or receiver. In some embodiments, beacon registry 105 may be configured to select beacons based on user preferences. In certain aspects, these preferences may be expressed in database 201. For example, they may be expressed in user entry 303. As an additional example, the user preferences may be expressed in preferences 326. In some aspects, the user preferences may be expressed in beacon request message 350. User preferences may include preferences for one or more of an entity associated with a beacon (e.g., a major retailer or financial institution), for a category of good or service associated with the beacon (e.g., the user may prefer beacons associated with clothing stores), for a category of offer (e.g., the user may prefer beacons associated with sales), for a confidence rating of a beacon (e.g., the user may prefer beacons having with a confidence rating better than a specified rating). In some embodiments, beacon registry 105 may be configured to provide connection information 361. This connection information may comprise connection information for beacons meeting the proximity and preference criteria.

Location services information 363 may comprise one or more of offers, directions, and product information, consistent with disclosed embodiments. Beacon registry 105 may be configured to provide location services information 363 in response to beacon request message 350. In some embodiments, location services information 363 may be derived at least in part from beacon information stored in beacon registry 105. For example, location services information 363 may be derived from beacon metadata 315 of beacon entries for selected beacons. As an additional example, location services information 363 may be derived from one or more of manager metadata 316 and user-submitted metadata 317. In certain embodiments, location services information 363 may be derived at least in part from information retrieved from one or more beacon systems associated with the selected beacons.

Figure 3F:
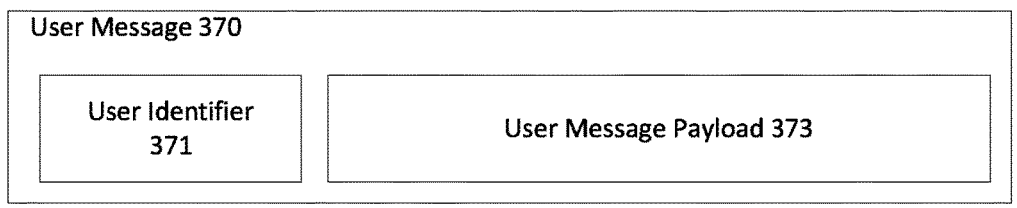

FIG. 3F discloses an exemplary user message 370 consistent with disclosed embodiments. In some embodiments, user device 110 may be configured to provide user message 370 to one or more of beacon registry 105, beacon system 120, provider system 125, and second user device 112. In some embodiments, user message 370 may comprise one or more of user identifier 371 and user message payload 373.

As described above with regard to user identifier 353, user identifier 371 may comprise identifying data or instructions. In some aspects, user identifier 371 may identify user 110a. For example, user identifier 371 may comprise a username and password, or International Mobile Subscriber Identity (IMSI), or similar data for identifying user 110a known to one of skill in the art. In certain aspects, user identifier 371 may identify user device 110. For example, user identifier 371 may comprise a Mobile Station International Subscriber Directory Number (MSISND), a media access control address (MAC address), or similar data for identifying user device 110. In some embodiments, beacon registry 105 may be configured to determine user entry 303 based on user identifier 371.

User message payload 373 may depend on the target of user message 370. In some aspects, user message 370 may comprise a request to share connection information for at least one beacon and/or receiver with second user device 112, and user message payload 373 may comprise connection information for the shared at least one beacon and/or receiver. User message payload 373 may also comprise user metadata regarding the shared at least one beacon and/or receiver, as described above with regards to FIG. 3A. In certain aspects, user message 370 may comprise a request for location service information based on an indication received from one of beacons/receivers 115. For example, the request for location services may be provided to one or more of beacon registry 105, beacons/receivers 115, beacon system 120, and provider system 125. User message payload 373 may then comprise one or more of location information, preference information, and an indication of requested location services.

FIG. 3G discloses an exemplary provider information request 380 consistent with disclosed embodiments. In some embodiments, beacon registry 105 may be configured to receive provider information request 380. Beacon registry 105 may be configured to receive provider information request 380 from one or more of beacon system 120 and provider system 125. In some aspects, provider information request 380 may comprise a request for aggregate information concerning users of location system 100. For example, provider information request 380 may concern a number of users that traversed a location near a beacon, or an amount of transactions occurring in the vicinity of a beacon. As an additional example, provider information request 380 may concern the typical demographics of a user traversing a location near a beacon. One of skill in the art would recognize that additional queries are possible, and the disclosed examples of provider information requests are not intended to be limiting.

In certain aspects, provider information request 380 may comprise a request for information regarding one or more specific users of location system 100. For example, provider information request 380 may concern a user associated with a user device that recently provided a beacon request message 350. In some aspects, provider information request 380 may concern one or more of the user location history, transaction history, demographics, and the social media activity for this user. In response to provider information request 380, beacon registry 105 may be configured to provide this information to the extent permitted by preferences 326. The response to the provider information request 380 may enable a provider system (e.g., provider system 125) to assess user 110a. For example, a provider system may be configured to determine that a user is a potential customer. As an additional example, a provider system may be able to determine that user 110a is a new, repeat, or multiple-repeat customer of a competitor. As an additional example, a provider system may be configured to identify facilities previously visited by user 110a based on user location history data. The provider system may be configured to then estimate a desired service or good based on the facilities previously visited by user 110a. In some embodiments, the provider system may be configured to send messages to user device 110 based on such assessments. For example, the provider system may be configured to provide offers and directions to potential customers. As an additional example, the provider system may be configured to offer competing products based on the estimated desired service or good.

FIG. 3H discloses an exemplary provider trigger request 390, consistent with disclosed embodiments. In some aspects, beacon registry 105 may be configured to receive provider trigger request 390. In some embodiments, the provider trigger request may comprise one or more of provider trigger criteria 391 and a trigger action 393.

Provider trigger criteria 391 may comprise data or instructions that, when processed by beacon registry 105, establish conditions for triggering actions, consistent with disclosed embodiments. For example, as described above with respect to FIG. 3G, a provider system may be configured to determine potential customers based on one or more of a user location history, transaction history, user demographics, and social activity. In some embodiments, such a determination may be expressed as a set of trigger criteria and provided to beacon registry 105 in provider trigger criteria 391. Similarly, trigger criteria may be associated with user interest in products on which a provider, e.g., a merchant, is currently extending special offers. As described above, such interest may be established based on the past location history of a user.

Trigger action 393 may comprise data or instructions that, when processed by beacon registry 105, configure beacon registry 105 to perform actions upon satisfaction of corresponding provider trigger criteria. In some embodiments, beacon registry 105 may be configured by trigger action 393 to provide a trigger to one or more of beacon system 120 and provider system 125 upon receipt of an indication from a user device satisfying the provider trigger criteria. Beacon system 120 and/or provider system 125 may be configured by the content of the trigger to communicate with the user device. In certain embodiments, beacon registry 105 may be configured by trigger action 393 to provide location services information to a user device upon receipt of a trigger indication from one or more of a user device or a beacon and/or receiver. In certain aspects, the location services information may be provided according to the provider trigger criteria. For example, the provider services criteria may specify the offers, directions, and product information provided. For example, beacon registry 105 may be configured by provider trigger request 390 to provide offers of discounted swimwear to a user device (e.g., user device 110) when beacon registry 105 receives an indication that the user device is in proximity to a beacon and/or receiver. In some aspects, the indication may be received from the user device. In certain aspects, the indication may be received from the beacon and/or receiver.

Figure 4:
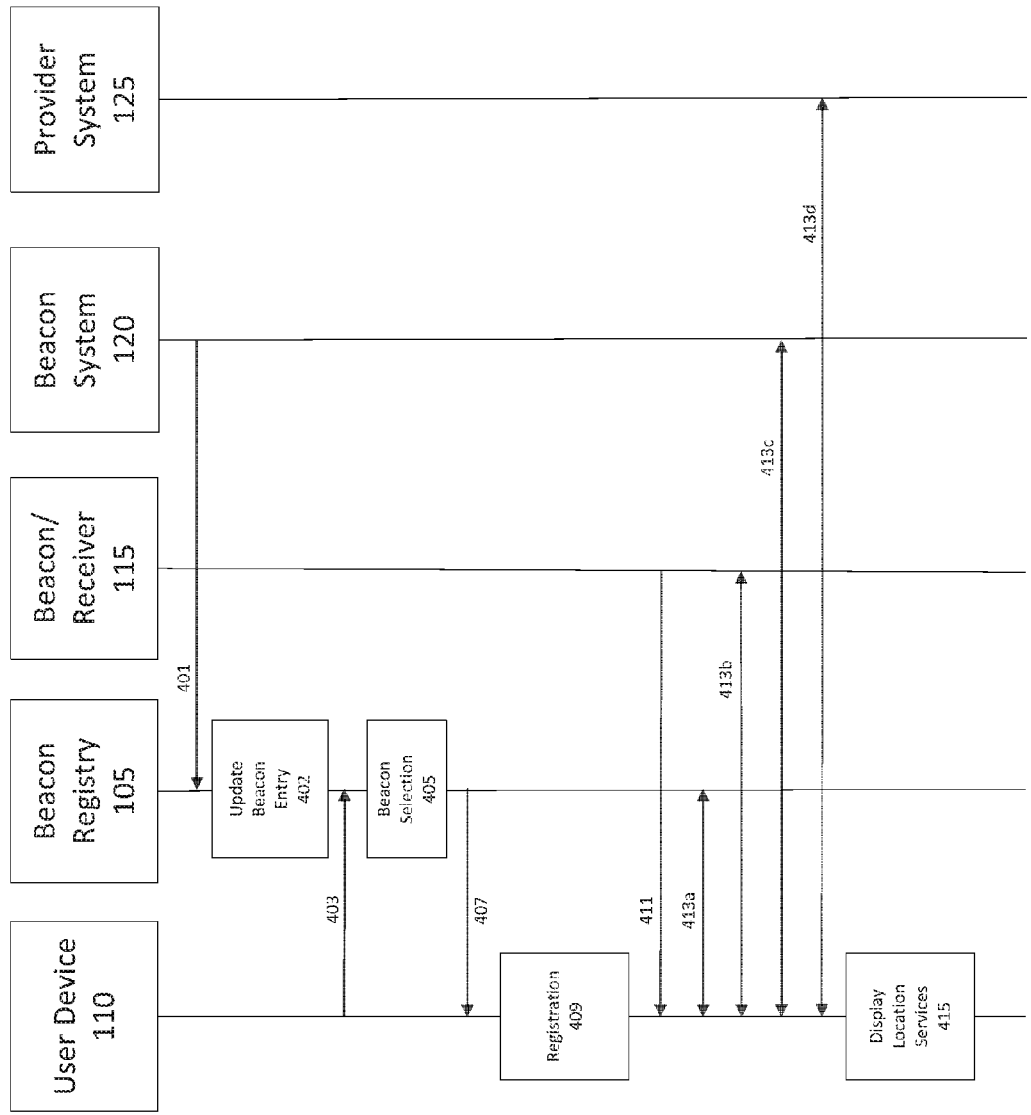
FIG. 4 depicts exemplary operations in a process for providing location services to a user device.

FIG. 4 depicts exemplary operations in a process for providing location services to a user device, consistent with disclosed embodiments. In some embodiments, in step 401, beacon system 120 may be configured to provide beacon information for beacons and/or receivers (e.g., beacons/receivers 115). In certain aspects, beacon system 120 may be configured to provide the beacon information to beacon registry 105. The beacon information may comprise a beacon information message (e.g., beacon information message 340), as described above with respect to FIG. 3C.

Beacon registry 105 may be configured to update one or more beacon entries (e.g., beacon entry 301) of database 201 corresponding to beacons/receivers 115 in step 402, consistent with disclosed embodiments. In some embodiments, the beacons/receivers may be updated according to the beacon information message. As would be understood by one of skill in the art, beacon registry 105 may also be configured to create, modify, or delete one or more beacon entries according to the beacon information message.

Beacon registry 105 may be configured to receive a beacon request (e.g., beacon request message 350) from user device 110 in step 403, consistent with disclosed embodiments. As described above with regards to FIG. 3D, the beacon request may include one or more of a user location, user identifier, and user update metadata.

Beacon registry 105 may be configured to select beacons based on the beacon entries of database 201 and the received beacon request in step 405, consistent with disclosed embodiments. In some embodiments, beacon registry 105 may be configured to select beacons based on a proximity criterion. In some aspects the proximity criterion may be distance based. For example, beacon registry 105 may be configured to select beacons sufficiently close to user device 110 to be detected by user device 110. As an additional example, beacon registry 105 may be configured to select receivers sufficiently close to user device 110 to be detectable by user device 110. In certain aspects, the proximity criterion may include selecting beacons/receivers in the same environment as the user device. For example, beacon registry 105 may be configured to select beacons/receivers in the same facility as the user device, such as the same store, mall, building, or highway.

Beacon registry 105 may be configured to provide selected beacon information to the user device in step 407, consistent with disclosed embodiments. Beacon registry 105 may be configured to provide the selected beacon information using selected beacon message 360, consistent with disclosed embodiments. As described above with regard to FIG. 3E, selected beacon message 360 may comprise one or more of connection information 361 and location services information 363. In some aspects, connection information 361 may comprise information enabling user device 110 to connect with the selected beacons/receivers. For example, connection information 361 may comprise UUIDs, or similar identifiers, for the selected beacons/receivers.

User device 110 may be configured to register the selected beacons/receivers in step 409, consistent with disclosed embodiments. In some embodiments, registering the selected beacons/receivers may enable user device 110 to detect the selected beacons/receivers. In some aspects, registering the selected beacons/receivers may comprise configuring one or more of application 205 or user device 110 with connection information 361. For example, connection information 361 may comprise a set of UUIDs, or similar identifiers. In some aspects, registering the selected beacons/receivers may configure one or more of application 205 and the operating system of user device 110 to scan for beacons/receivers with the UUIDs, or similar identifiers, specified in the connection information.

User device 110 may be configured to receive an indication from one of beacon/receiver 115 in step 411, consistent with disclosed embodiments. In some embodiments, the indication may comprise a broadcast message provided by a beacon. For example, the broadcast message may comprise the UUID, or a similar identifier. Based on the received broadcast message, user device 110 may be configured to establish a connection with the one of beacon/receiver 115. This connection may enable communication between user device 110 and the connected one of beacon/receiver 115. As would be appreciated by one of skill in the art, in certain embodiments, the indication may be generated by a receiver based on a broadcast message provided by user device 110.

User device 110 may be configured to communicate with one or more of beacon registry, beacon/receiver 115, beacon system 120, and provider system 125 in steps 413a-413d, consistent with disclosed embodiments. In some embodiments, user device 110 may be configured to communicate based on the connection with beacon/receiver 115. As described above with respect to FIG. 3F, user device 110 may be configured to provide a user message 370. This user message may comprise one or more of a user identifier 371 and user message payload 373. In some embodiments, the user message payload may comprise one or more of connection information (to enable sharing of the connected one of beacons/receivers 115), user metadata regarding the shared at least one beacon and/or receiver (to enable updating of the beacon entry) and a request for location service information based on an indication received from one of beacons/receivers 115.

User device 110 may be configured to display location services information in step 415, consistent with disclosed embodiments. In certain embodiments, user device 110 may be configured by application 205 with a graphical user interface for disclosing the received location services information. For example, application 205 may be configured to display one or more received offers, directions, or products using the graphical user interface.

Figure 5:
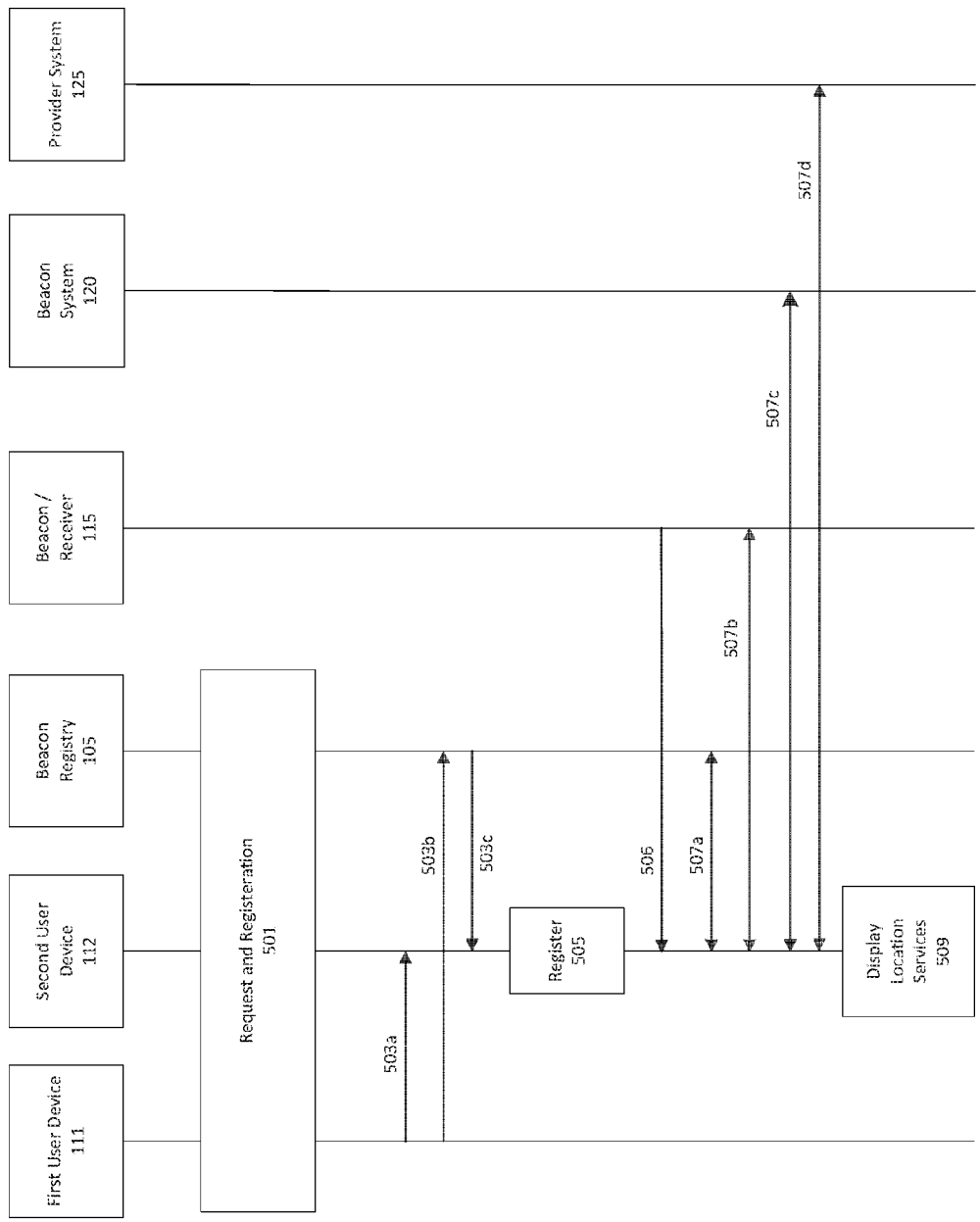
FIG. 5 depicts exemplary operations in a process for providing location services to additional user devices.

FIG. 5 depicts exemplary operations in a process for providing location services to additional user devices, consistent with disclosed embodiments. In some embodiments, in step 501, beacon registry 105 and first user device 111 may be configured to communicate. As described above with regards to FIG. 4, first user device 111 may be configured to provide a beacon request (e.g., beacon request message 350) to beacon registry 105. In response, beacon registry 105 may be configured to select beacons. In some aspects, beacon registry 105 may be configured to select beacons based on beacon entries in database 201. In certain aspects, beacon registry 105 may be configured to select beacons based on user entries in database 201. For example, beacon registry 105 may be configured to select beacons based on proximity, using location 311 and user location 351 (or user location history 321). As an additional example, beacon registry 105 may be configured to select beacons based on beacon metadata 315 and user metadata 323. For example, beacon registry 105 may be configured to select beacons based on confidence rating 318 and preferences 326. In some aspects, beacon registry 105 may be configured to provide beacon information for selected beacons to first user device 111. In some embodiments, first user device 111 may be configured to register the selected beacons, as described above with regards to FIG. 4.

First user device 111 may be configured to provide a first user message (e.g., user message 370), consistent with disclosed embodiments. In some embodiments, in step 503a, first user device 111 may be configured to provide a first user message to second user device 112. In certain aspects, the first user message may provide communication information for one or more of beacons/receivers 115 to second user device 112. In certain embodiments, in step 503*b*, first user device 111 may be configured to provide a first user message to beacon registry 105. In some aspects, the first user message may comprise instructions. In certain aspects, the instructions may configure beacon registry 105 to provide beacon information for one of more of beacons/receivers 115 to second user device 112 in step 503*c*. In this manner, location system 100 may enable first user device 111 to directly or indirectly share communication information regarding one or more of beacons/receivers 115 with second user device 112. In some embodiments, in the same manner, user comments and ratings regarding beacons (e.g., user-submitted metadata 317 and confidence rating 318) may also be directly or indirectly shared.

Second user device 112 may be configured to register the one or more beacons/receivers in step 505, consistent with disclosed embodiments. In some embodiments, second user device 112 may be configured to register the one or more beacons/receivers using the received communication information as in step 409. Second user device 112 may be configured to receive an indication of one of the selected beacons/receivers in step 506, consistent with disclosed embodiments. Similar to user device 110, as described above with respect to step 411, second user device 112 may be configured to establish a connection with the one of beacons/receivers 115. Similar to user device 110, as described above with respect to steps 413*a*-413*d*, second user device 112 may be configured to communicate with one or more of beacon registry 105, beacon/receiver 115, beacon system 120, and provider system 125 in steps 507*a*-507*d*. As in step 415, second user device 112 may be configured to display location services information received from one or more of the beacon registry 105, beacon/receiver 115, beacon system 120, and provider system 125 in step 509.

Figure 6:
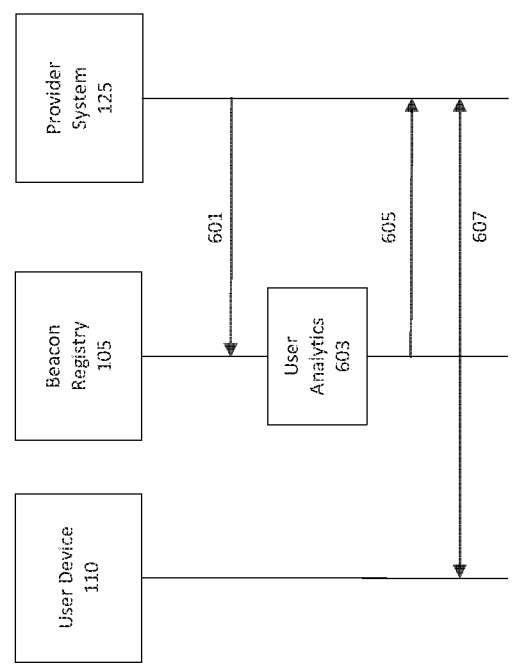
FIG. 6 depicts exemplary operations in a process for providing locations services based on user analytics

FIG. 6 depicts exemplary operations in a process for providing locations services based on user analytics, consistent with disclosed embodiments. Provider system 125 (or beacon system 120) may be configured to provide a provider information request (e.g., provider information request 380) in step 601. In some aspects, as described above with respect to FIG. 3G, the provider information request may be configured to request user information. In some aspects, the provider information request may concern aggregate user information. For example, beacon registry 105 may be configured to use analytics engine 203 to determine the customer segments and descriptive demographics of users traversing a particular location in a given day. This information could also be broken out by competitors in each customer segment (e.g., the number of users associated with a competitor, such as another mobile phone provider).

In certain aspects, the provider information request may concern individual user information. Beacon registry 105 may be configured to use analytics engine 203 to determine a response to the provider information request in step 603, consistent with disclosed embodiments. In some aspects, analytics engine 203 may be configured to use user entry 303 to determine the response to the provider information request. For example, analytics engine 203 may be configured to use one or more of user location history and user metadata 323, according to user preferences, as described above with response to FIG. 3G. In some embodiments, the response may depend on the user location history. In some aspects, the user location history depends on the beacon requests of a user device, as a user device may be configured by application 205 to report user location 351 with each beacon request. Beacon registry 105 may be configured to provide a response to provider system 125 (or beacon system 120) in step 605, consistent with disclosed embodiments. In some aspects, the response may comprise user information. As a non-limiting example, if the provider is a merchant, the user information may identify potential customers of the merchant associated with provider system 125 (or beacon system 120). The user information may also identify customers of a competitor of provider system 125 (or beacon system 120). In step 607, provider system 125 (or beacon system 120) may be configured to provide location service information to user device 110 through network 130 based on the user information received from beacon registry 105. For example, provider system 125 may be configured to provide targeted offers, such as discounts for relevant products, to users currently located at facilities of competitors. As an additional example provider system 125 may be configured to identify users that may be potential clients and direct them to a facility of provider system 125.

Figure 7:
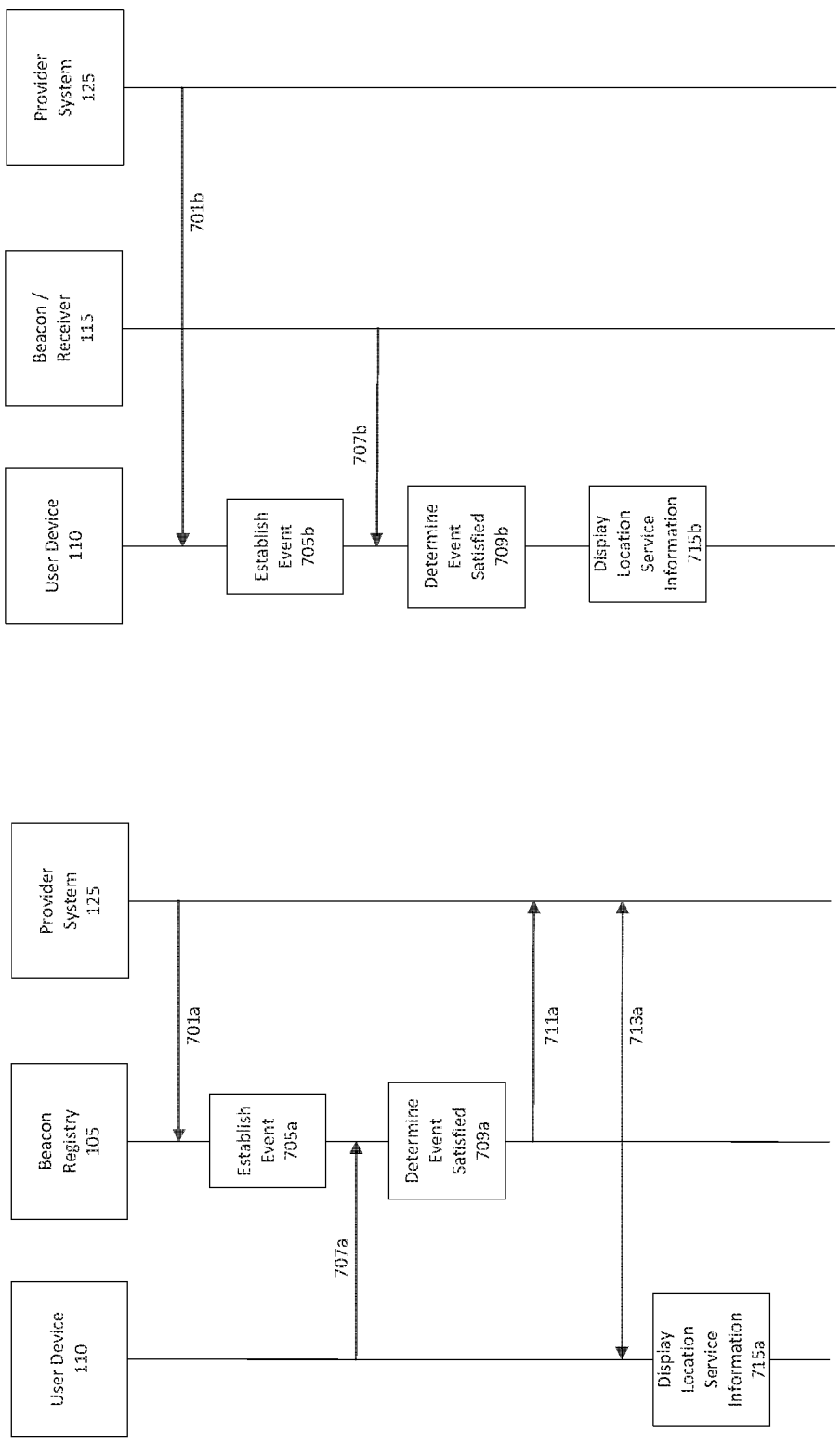
FIGS. 7A and 7B depict exemplary operations in a process for providing location services using on registered events.

FIGS. 7A and 7B depict exemplary operations in a process for providing location services using registered events, consistent with disclosed embodiments. FIG. 7A depicts an exemplary system for providing location services information using events managed by beacon registry 105. Beacon registry 105 may be configured to receive a provider trigger request in step 701*a*, consistent with disclosed embodiments. In some embodiments, as described above with respect to FIG. 3H, the provider trigger request (e.g., provider trigger request 390) may comprise provider trigger criteria. In some aspects, the provider trigger criteria may describe desired characteristics of users. For example, the provider trigger criteria may describe potential customers, high-spending customers, or customers potentially convertible from competitors, in terms of a user data, such as user location history, transaction history, demographics, or social media presence. One of skill in the art would appreciate that other beneficial user categories may be determined from such user data, and the envisioned systems and methods are not limited to the customer categories described above. Beacon registry 105 may be configured to establish an event trigger in step 705*a*, consistent with disclosed embodiments.

User device 110 may provide an indication capable of satisfying the provider trigger criteria in step 707*a*. In some embodiments, communications from user device indicating interactions with location system 100 may satisfy the provider trigger criteria. For example, a beacon request may comprise an indication capable of satisfying the provider trigger criteria. As an additional example, a user message or a report of a communication between user device 110 and one or more of beacons/receivers 115 and beacon system 120 may also comprise an indication capable of satisfying the provider trigger criteria.

Beacon registry 105 may be configured to determine that the indication satisfied the established event in step 709*a*. This determination may be based on the contents of the indication and the provider trigger criteria. Beacon registry 105 may be configured to perform a trigger action (e.g., trigger action 393) based on the determined satisfaction of the provider trigger criteria. In some embodiments, this trigger action may comprise providing a trigger to provider system 125 in step 711*a*. In some aspects, the trigger may enable communication between provider system 125 and user device 110. For example, the trigger may include identifying information, such as an email address, IM address, username, IMSI, or similar identifying information.

The trigger may also be configured to indicate the trigger criteria satisfied by the indication provided by the user device 110.

Provider system 125 (or beacon system 120) may be configured to use the information provided by the trigger received from beacon registry 105 to communicate with user device 110 in step 713a, consistent with disclosed embodiments. As described with regards to FIGS. 4 and 5, user device 110 may be configured to receive and display location services information provided by provider system 125 in step 715a, consistent with disclosed embodiments.

FIG. 7B depicts an exemplary system for providing location services information using events managed by user device 110. In some embodiments, user device 110 may be configured to receive a provider trigger request (e.g., provider trigger request 390) from provider system 125. The provider trigger request may comprise provider trigger criteria as describe above. However, provider trigger request may comprise a trigger action 393 that causes user device 110 to display location service information according to the trigger action. In step 705b, user device 110 may be configured to establish an event on user device 110, similar to the event established in step 705a. In step 707b, user device 110 may be configured to receive an indication from one or more of beacons/receivers 115. For example, user device 110 may be configured to receive a UUID or other identifying feature. In some aspects, the one or more of beacons/receivers 115 may have been previously registered by user device 110, to enable user device 110 to scan for the indication.

User device 110 may be configured to determine that the indication received from beacon receiver satisfies one or more of the event conditions established in step 709b, consistent with disclosed embodiments. For example, provider system 125 may have been configured to provide provider trigger messages satisfied by the receipt of an indication from certain ones of beacons/receivers 115. In some aspects, these indications may show that user 110a is proximate to the beacon/receiver providing or receiving the indication. Thus suitable location services may be determined based on a receipt of an indication from certain ones of beacons/receivers 115. Similar to the description above with regard to FIGS. 4 and 5, in step 715b, user device may be configured to display location services, such as offers, directions, and product information, on a graphical user interface of user device 110.

Figure 8:
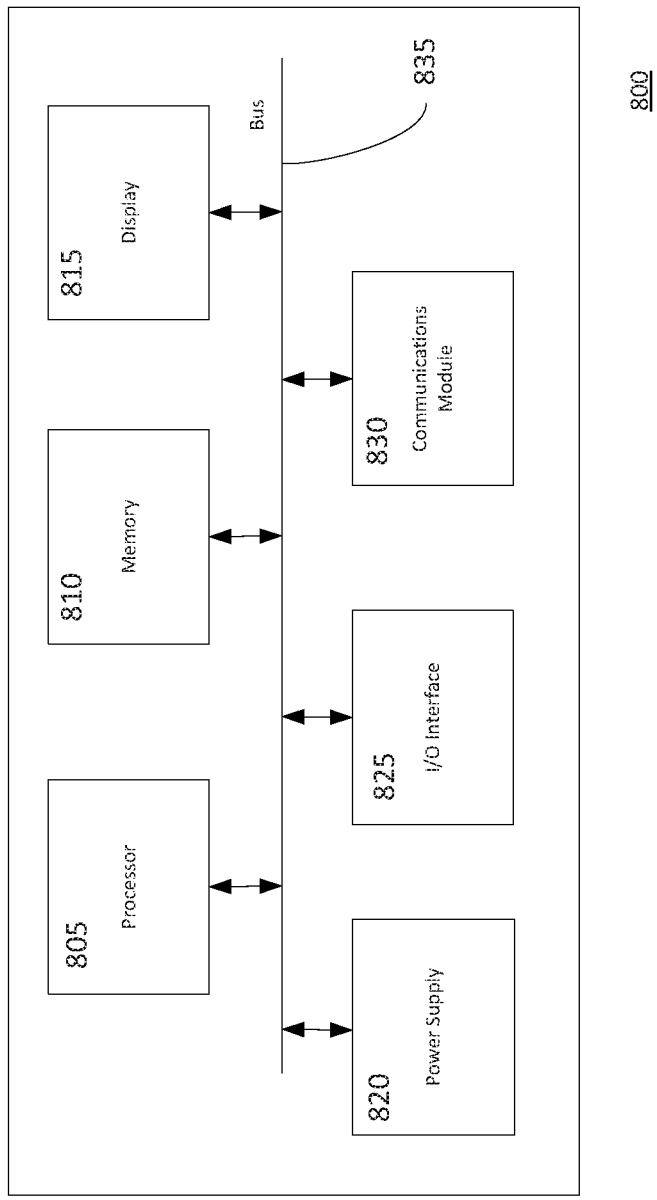
FIG. 8 depicts an exemplary schematic of a computing device for providing location services.

FIG. 8 depicts a schematic of an electronic device 800 of location system 100, consistent with disclosed embodiments. According to some embodiments, electronic device 800 may include a processor 805, memory 810, display 815, power supply 820, I/O interface(s) 825, and communications module 830. These units may communicate with each other via bus 835 or wirelessly. The components shown in FIG. 8 may reside in a single device or multiple devices.

Processor 805 may be one or more microprocessors, central processing units, or graphics processing units performing various methods in accordance with disclosed embodiments. Memory 810 may include one or more computer hard disks, random access memory, removable storage, or remote computer storage. Memory 810 may be configured to store software programs executed by processor 805. In some embodiments, electronic device 800 may comprise display 815. Display 815 may comprise one or more of an LED display, LCD display, CRT display, or similar display consistent with disclosed embodiments. In some embodiments, electronic device 800 may comprise power supply 820. In some aspects, power supply 820 may include components for converting mains electricity to voltages and/or currents suitable for use by other components of electronic device 800. In certain aspects, power supply 820 may comprise an energy storage device, such as a battery, capacitor, or other energy storage device known to one of skill in the art. In some embodiments, electronic device 800 may comprise I/O interfaces 825. I/O interfaces 825 may include keyboard, a mouse, an audio input device, a touch screen, or similar human interface device, consistent with disclosed embodiments. Communications module 830 enables the exemplary device to exchange information with components of FIG. 1 over network 130. In various embodiments, communications module 830 may be configured to support wireless or wired networks. In certain aspects, communications module 830 may be configured with modules for supporting one or more local area networks, personal area networks, Bluetooth networks, RFID networks, and near-field networks. As would be recognized by one of skill in the art, in some embodiments, electronic device 800 may include some or all of the components listed in FIG. 8.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, CD-ROM, or other forms of RAM or ROM. Accordingly, the disclosed embodiments are not limited to the above described examples, but instead is defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A beacon registering device for providing location services, comprising:
   a non-transitory memory storing instructions; and
   one or more processors that execute the stored instructions to perform operations comprising:
      receiving beacon information from a beacon system through an application programming interface, the beacon information comprising connection information for a plurality of beacons;
      updating a beacon entry stored in a database based on the received beacon information, the beacon entry including a beacon location, beacon connection information, and beacon metadata;

determining a confidence rating for the beacon entry based on at least one of attributes of the beacon entry or the beacon metadata;

receiving a beacon request from a user device through the application programming interface, the beacon request indicating a user location;

selecting a first beacon from the plurality of beacons based on the beacon entry, the beacon request, and confidence ratings of the beacons; and providing selected beacon information to the user device for registering the first beacon with the user device, the selected beacon information including the connection information for the first beacon.

2. The beacon registering device of claim 1, wherein the beacon metadata includes one or more of a provider, a product, an offer, or a depiction.

3. The beacon registering device of claim 1, wherein the one or more processors further execute the stored instructions to perform operations comprising updating user entries including user location histories and user metadata based on the beacon request, the user metadata including one or more of user transaction histories, user demographics, user preferences, or user social activity.

4. The beacon registering device of claim 1,
wherein the beacon metadata comprises user-submitted metadata including one or more of a review, a rating, or a description associated with the first beacon; and
wherein the one or more processors further execute the stored instructions to perform operations comprising updating the user-submitted metadata based on user submissions.

5. The beacon registering device of claim 1, wherein selecting the first beacon comprises selecting a beacon based on proximities of beacon locations and a location of the user device.

6. The beacon registering device of claim 1, wherein selecting the first beacon comprises selecting a beacon having beacon metadata which satisfies user preferences associated with the beacon request.

7. The beacon registering device of claim 1, wherein the beacon entry attributes include one or more of sources, freshness, or submission frequency of the beacon information.

8. The beacon registering device of claim 1,
wherein the user device is a first user device; and
wherein the one or more processors further execute the stored instructions to perform operations comprising:
receiving a user message from the first user device requesting that the connection information be shared with a second user device, and
providing the connection information to the second user device.

9. The beacon registering device of claim 1, wherein the one or more processors further execute the stored instructions to perform operations comprising:
receiving a provider information request for user information from a provider system;
determining the user information according to the provider information request based on the beacon requests; and
providing the user information to the provider system.

10. The beacon registering device of claim 9, wherein the user information includes aggregate demographic information or aggregate transaction information for users interacting with one or more beacons.

11. The beacon registering device of claim 1, wherein the one or more processors further execute the stored instructions to perform operations comprising:
receiving, from a provider system, a provider trigger request including provider trigger criteria;
establishing an event trigger;
determining that an indication received from the user device satisfies the provider trigger criteria; and
providing, to the provider system, a trigger for communicating with the user device.

12. The beacon registering device of claim 11, wherein the indication includes the beacon request or a user message.

13. The beacon registering device of claim 11, wherein a location of the user device satisfies the provider trigger criteria.

14. The beacon registering device of claim 11, wherein a user location history or user metadata associated with the indication satisfies the provider trigger criteria.

15. A computer-implemented method for providing location services, comprising:
receiving beacon information from a beacon system through an application programming interface, the beacon information comprising connection information for a plurality of beacons;
updating a beacon entry stored in a database based on the received beacon information, the beacon entry including a beacon location, beacon connection information, and beacon metadata;
determining a confidence rating for the beacon entry based on at least one of attributes of the beacon entry or the beacon metadata;
receiving a beacon request from a user device through the application programming interface, the beacon request indicating a user location;
selecting a first beacon from the plurality of beacons based on the beacon entry, the beacon request, and confidence ratings of the beacons; and
providing selected beacon information to the user device for registering the first beacon with the user device, the selected beacon.

16. A user device for providing location services, comprising:
a non-transitory memory storing instructions;
a display; and
one or more processors that execute the stored instructions to perform operations comprising:
intermittently determining a user location and transmitting the user location in a beacon request to a beacon register through an application programming interface;
receiving beacon information from the beacon register, the beacon information including connection information for a first beacon selected by the beacon register from a plurality of beacons based at least in part on confidence ratings of the beacons;
registering the selected beacons using the connection information;
receiving an indication from a registered selected beacon; and
displaying, on the display, location services information based on the received indication.

17. The user device of claim 16, wherein displaying the location services information based on the received indication comprises:
generating a user message based on the received indication to one or more of the beacon registry, the registered selected beacon, a beacon system, or a provider system;

receiving the location services information in response to the user message; and displaying the location services information.

18. The user device of claim 16, wherein the one or more processors further execute the stored instructions to perform operations comprising:

receiving a provider trigger request from a provider system, the provider trigger request including provider trigger criteria and the location services information;

determining whether the received indication satisfies the provider trigger criteria; and when it is determined that the received information satisfies the provider trigger criteria, displaying the location services information.

19. The user device of claim 16, wherein the one or more processors further execute the stored instructions to perform operations comprising:

generating a user message and transmitting the user message to the beacon registry, wherein the user message causes the beacon registry to share the connection information with another user device.

* * * * *